United States Patent
Rodibaugh

(10) Patent No.: US 6,319,417 B1
(45) Date of Patent: Nov. 20, 2001

(54) SELF-CLEANING FILTER SYSTEM

(76) Inventor: Scott A. Rodibaugh, 17026 Banchory, Spring, TX (US) 77379

( * ) Notice: Subject to any disclaimer, the term of this patent is extended or adjusted under 35 U.S.C. 154(b) by 0 days.

(21) Appl. No.: 09/532,363

(22) Filed: Mar. 21, 2000

(51) Int. Cl.$^7$ ................................................ B01D 17/038
(52) U.S. Cl. ................ 210/787; 184/6.24; 210/168; 210/259; 210/512.1; 210/806
(58) Field of Search .................. 210/167, 168, 210/259, 304, 440, 443, 444, 499, 512.1, 787, 791, 314, 360, 446, 781, 806, 497.01; 184/6.24; 123/196 A, 196 R

(56) References Cited

U.S. PATENT DOCUMENTS

| | | | |
|---|---|---|---|
| 3,994,810 | 11/1976 | Schaeffer | 210/103 |
| 4,042,504 | 8/1977 | Drori | 210/107 |
| 4,581,135 | 4/1986 | Gerulis | 210/108 |
| 4,612,116 | 9/1986 | Hindman et al. | 210/333 |
| 4,645,591 | 2/1987 | Gerulis | 210/108 |
| 4,668,393 * | 5/1987 | Stone | 210/304 |
| 4,995,968 | 2/1991 | Snelling | 210/108 |
| 5,603,829 * | 2/1997 | Baumann | 210/440 |
| 5,643,448 | 7/1997 | Martin et al. | 210/232 |
| 5,762,783 | 6/1998 | Harvey | 210/108 |
| 5,779,900 | 7/1998 | Holm et al. | 210/411 |
| 5,816,212 * | 10/1998 | Lindquist et al. | 210/168 |
| 5,830,347 | 11/1998 | Vollmer | 210/107 |
| 6,125,826 * | 3/2000 | Brocard et al. | 210/304 |

* cited by examiner

Primary Examiner—Joseph W. Drodge
(74) Attorney, Agent, or Firm—Frank J. Catalano

(57) ABSTRACT

A filter is provided which uses a particle barrier with its "dirty" side flow path connected in series with a centrifuge. The "dirty" side flow path has an inlet and an outlet for delivering fluid with particles suspended therein under pressure against the "dirty" surface of the particle barrier. The barrier has a plurality of fluid passages through it which are sized to collect particles suspended in the fluid on the "dirty" surface of the barrier while passing some of the fluid through the barrier. A centrifuge serially connected to the outlet draws fluid containing suspended particles across the "dirty" surface to wash collected particles from the "dirty" surface of the barrier wall.

22 Claims, 4 Drawing Sheets

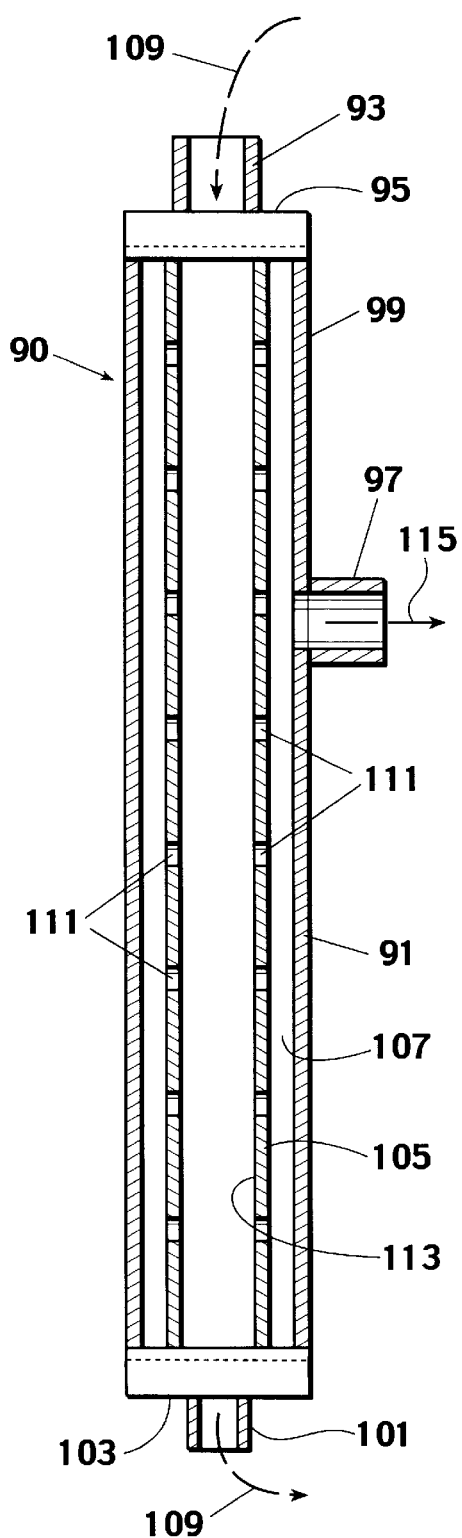
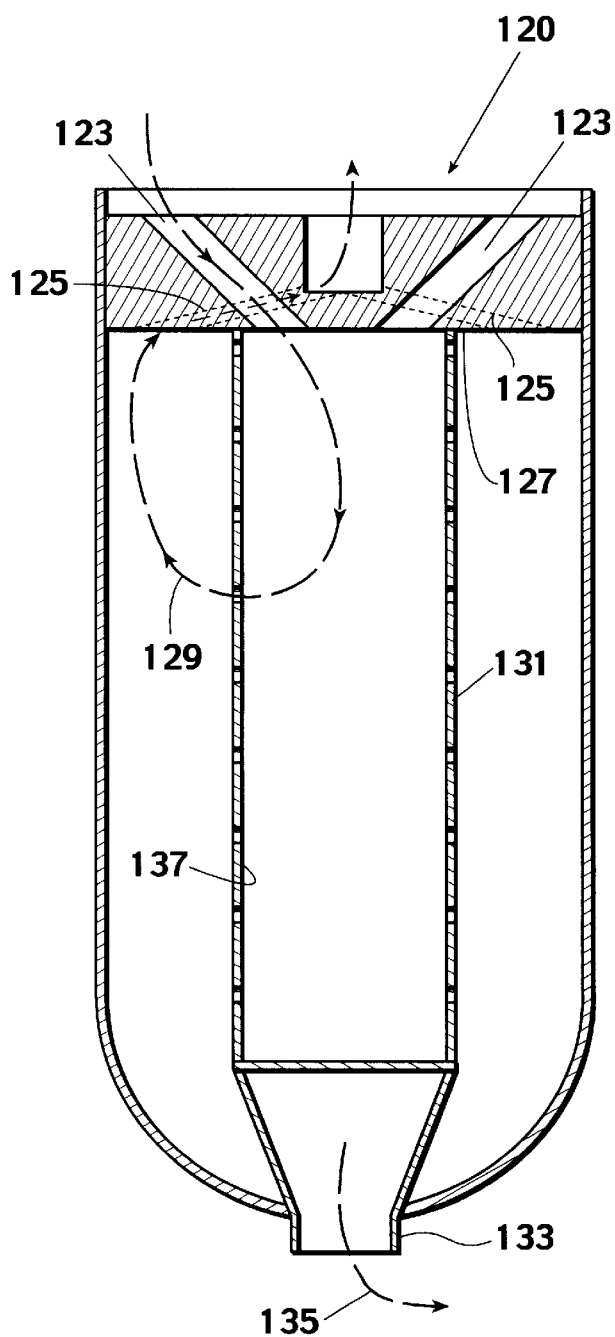
Fig. 8
Fig. 9

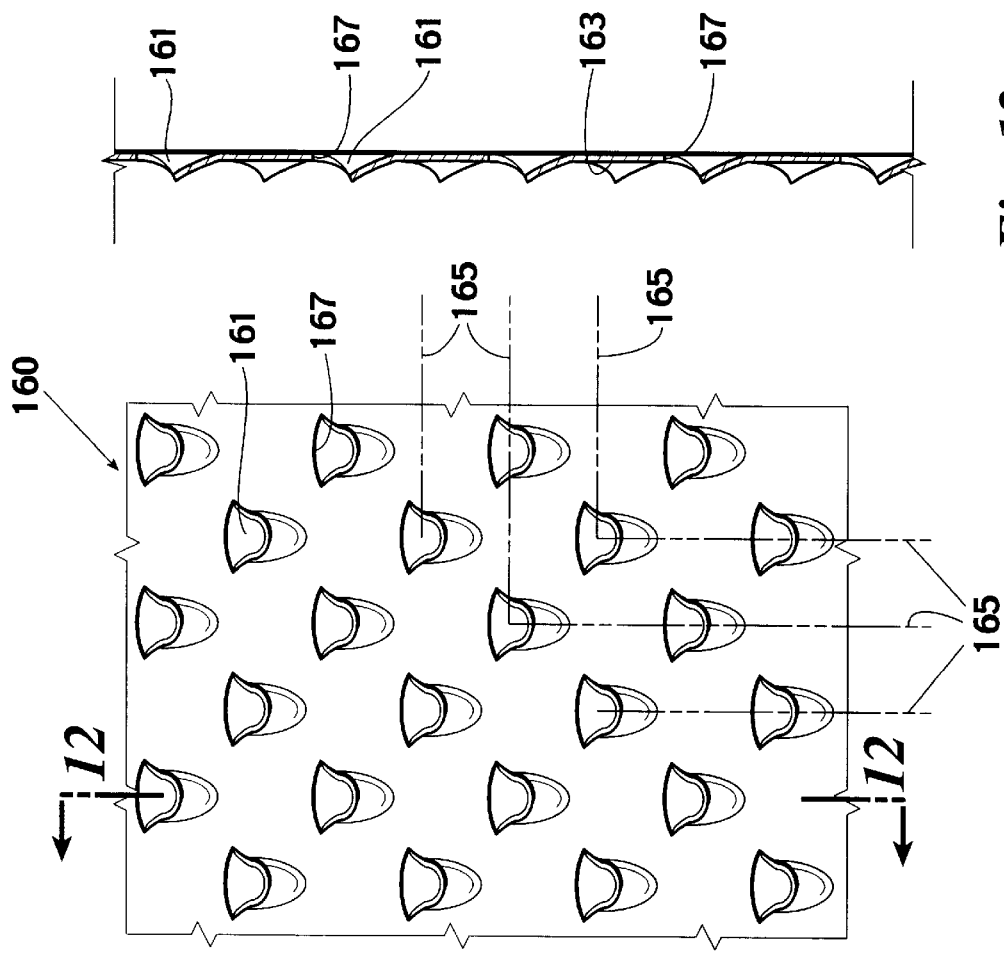
*Fig. 12*
*Fig. 11*
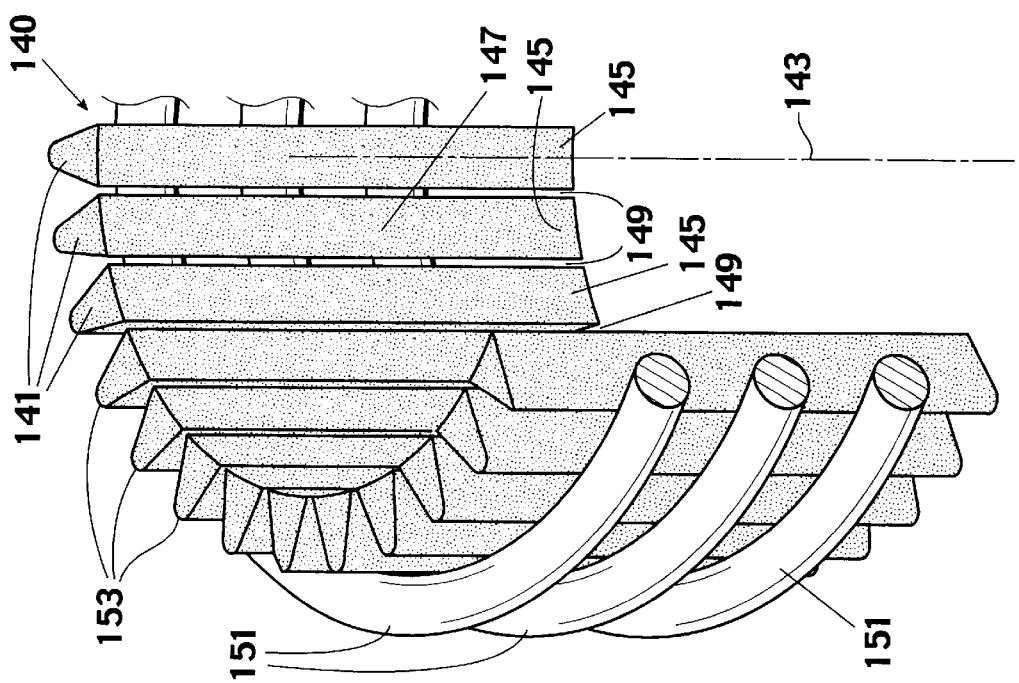
*Fig. 10*

SELF-CLEANING FILTER SYSTEM

BACKGROUND OF THE INVENTION

This invention relates generally to filter systems and more particularly concerns filter systems for removing particles from suspension in a fluid.

Filter systems will herein be explained in relation to those used to clean diesel engine lubricating oil. This application is selected because it is common to filter systems and because it is the application from which this invention was conceived. Those skilled in the art of filter systems will readily recognize, however, that many other applications exist as well.

Diesel engines cannot operate without lubricating oil and quickly fail if the cleanliness of the lubricating oil is not satisfactorily maintained. A typical lubricating oil circuit for a diesel engine is illustrated in FIG. 1. A pump P pulls oil from the sump S, and pushes it through a full-flow device F, which is the primary barrier to solid debris, from which it returns to the lubrication task in the engine E. In some circuits, such as the one shown, the full-flow device F is augmented by the use of a bypass device B, where a fraction of oil in comparison to that moving through the full-flow device F is cleaned of much smaller debris than is trapped in the full-flow device F. The bypass device B, however, is connected directly between the pump P and the sump S and is not in the flow path of the full-flow device F.

Full-flow devices F which use disposable filter screens generate waste, the disposal of which requires time and money and imposes long-term legal responsibility on the engine owner. In some cases, the total cost of disposing of a media-type filter approximates its acquisition cost. The use of cleanable screens rather than disposable screens as a full-flow device F with a self-powered centrifuge as the bypass B device according to FIG. 1 is now common in on-road heavy-duty diesels. This combination provides cleaner lubricating oil than can be achieved with disposable filter screens alone, but little impact has been made in resolving the other problems associated with disposable filters.

Many filter systems have been designed for use in a variety of applications including, but not limited to, cleaning diesel engine lubricating oil, in which a back-flush or reverse flow circuit is used to clean the filter barrier. Flow reversal is achieved by use of valves responsive to variations in the input to output pressure differential of the system or to a timing or other control mechanism which automatically cycles the flow direction. Such circuits involve additional components, maintenance and cost and require interruption and reversal of the normal operating flow patterns.

Still other systems use mechanical devices such as rotating scrubbers to clean the barrier. Such modifications are also more costly and maintenance demanding and are highly susceptible to failure.

It is, therefore, an object of this invention to provide a filter system for removing particles from a fluid which has extended operating time in comparison to known disposable and cleanable filters. Another object of this invention is to provide a filter system for removing particles from a fluid which has greater cleaning capacity in comparison to known disposable and cleanable filters. A further object of this invention is to provide a filter system for removing particles from a fluid which tends to self-clean during its normal operation. Yet another object of this invention is to provide a filter system for removing particles from a fluid which does not require back-flow to clean its particle barrier. It is also an object of this invention to provide a filter system for removing particles from a fluid which applies a centrifuge to the dirty side of the barrier to assist in washing collected particles from the barrier dirty side surface. Still another object of this invention is to provide a filter system for removing particles from a fluid which can use a wedgewire barrier so as to enhance the self-cleaning tendency. An additional object of this invention is to provide a filter system for removing particles from a fluid which can use a semi-conically apertured thin-walled metal barrier so as to enhance the self-cleaning tendency. Another object of this invention is to provide a filter system for removing particles from a fluid which is applicable to original equipment and after-market use. And it is an object of this invention to provide a filter system for removing particles from a fluid which reduces the waste disposal problems of known disposable and cleanable filters.

SUMMARY OF THE INVENTION

In accordance with the invention, a filter system is provided which uses a particle barrier with its "dirty" side flow path connected in series with a centrifuge. The "dirty" side flow path has an inlet and an outlet for delivering fluid with particles suspended therein under pressure against the "dirty" surface of the particle barrier. The barrier has a plurality of fluid passages through it which are sized to collect particles suspended in the fluid on the "dirty" surface of the barrier while passing some of the fluid through the barrier. A centrifuge serially connected to the outlet draws fluid containing suspended particles across the "dirty" surface to wash collected particles from the "dirty" surface of the barrier wall.

In the preferred inside-to-outside embodiment of the filter, the particle barrier has an axial fluid passage with an inlet at one end for admitting fluid containing suspended particles into the barrier and an outlet at another end for discharging fluid containing suspended particles from the barrier. The barrier also has a plurality of radial fluid passages through its wall which is sized to collect particles suspended in the fluid on the inner surface of the barrier while some of the fluid passes through the wall. The centrifuge is serially connected to the axial passage outlet to draw fluid containing suspended particles through the axial passage so as to wash collected particles from the inner surface of the barrier wall.

In the most preferred inside-to-outside embodiment, the filter barrier is a cylindrical wedgewire screen. Individual wedgewires of the screen extend parallel to the longitudinal axis of the filter with the base portions of their cross-sections defining the inner wall of the filter barrier and the spaces between the wedgewires defining the radial passages. A conical member can be concentrically aligned within the axial passage to increase the velocity of the fluid containing suspended particles through the axial passage.

In another inside-to-outside embodiment, the filter barrier is a thin-walled metal cylinder or inverted thin-walled metal cone and the radial passages are a matrix of semi-conical apertures preferably on the outer wall of the cylinder or cone. The semi-conical apertures preferably point in the direction of axial flow but could be aligned transverse to axial flow or in any other orientation that a given application of the filter might require.

In an outside-to-inside embodiment, the particle barrier cooperates with its outer cylindrical case which is concentrically aligned on a longitudinal axis. The barrier and case define an annular fluid passage with an inlet at one end for admitting fluid containing suspended particles into the annular passage and an outlet at another end for discharging fluid containing suspended particles from the annular passage. A plurality of radial fluid passages through the wall of the barrier are sized to collect particles suspended in the fluid on the outer surface of the wall while some of the fluid is passed through the wall. The centrifuge is serially connected to the annular passage outlet to draw fluid containing suspended particles through the annular passage so as to wash collected particles from the outer surface of the barrier wall. If the barrier chosen is a cylindrical wedgewire screen, individual wedgewires of the screen preferably extend parallel to the longitudinal axis of the filter and the base portions of their cross-sections define the outer wall of the filter barrier. The wedgewire could be circumferential if the scouring flow velocity is high enough.

A conical member can be concentrically aligned within the annular passage to increase the velocity of the fluid containing suspended particles through the annular passage. If the barrier chosen is a thin-walled metal cylinder or a thin-walled metal case, the radial passages are a matrix of semi-conical apertures on the inner wall of the cylinder or cone. The semi-conical apertures preferably point in the direction of annular flow but can be aligned transverse to annular flow or in any desired direction.

In practicing the preferred inside-to-outside method of the invention for removing particles from suspension in a fluid, fluid containing suspended particles is admitted into a particle barrier having an axial fluid passage and a plurality of radial fluid passages through its wall, the radial passages being sized to collect hard particles suspended in the fluid on an inner surface of the wall. Some of the admitted fluid is passed through the wall to collect particles on its inner surface. Fluid containing suspended particles is drawn through the axial passage using a centrifuge serially connected to the axial passage to wash collected particles from the inner surface of the barrier wall. In practicing the outside-to-inside method of the invention for removing particles from suspension in a fluid, fluid containing suspended particles is admitted into an annular fluid passage defined by a cylindrical case having a longitudinal axis and a particle barrier concentrically aligned within the case, the barrier having a plurality of radial fluid passages through its wall sized to collect particles suspended in the fluid on the inner surface of the wall. Some of the admitted fluid is passed through the wall to collect particles on its outer surface. Fluid containing suspended particles is drawn through the annular passage using a centrifuge serially connected to the annular passage to wash collected particles for the outer surface of the barrier wall.

In any of the above embodiments, the dirty side of the barrier is continuously scoured by flow to the centrifuge, which becomes the final dirt separating and storage device. Only the centrifuge is serviced. Axial wedgewire is the preferred primary debris barrier. Abrasive debris is blocked by the axial wedgewire, but is continuously washed away to final separation and storage in the centrifuge, where it remains until the centrifuge bowl is cleaned. This arrangement provides cleaner lubricating oil than known disposable filters and for longer periods of time. Furthermore, the combination of the barrier with a centrifuge serially connected to the "dirty" side flow path of the barrier can be so self-cleaning as to eliminate the need for service of the barrier.

This system is retrofittable and can be scaled for installation on any size engine. It can be adapted to spin-on and remote-mounted designs. This self-cleaning filter system provides a means to significantly reduce costs associated with filter acquisition, logistics and waste handling, while improving lubricating oil cleanliness at small particle sizes for extended engine and oil durability.

BRIEF DESCRIPTION OF THE DRAWINGS

Other objects and advantages of the invention will become apparent upon reading the following detailed description and upon reference to the drawings in which:

FIG. 8 is a diametric cross-section of an inside to outside embodiment of the self-cleaning filter;

FIG. 9 is a diametric cross-section of an inside to outside embodiment of the self-cleaning filter adapted for connection to an outside to inside engine mount;

FIG. 10 is a partial perspective view of the preferred wedgewire screen to be used as a barrier in the self-cleaning filter;

FIG. 11 is a partial front elevation view of a thin-walled metal barrier with semi-conical apertures; and FIG. 12 is cross-sectional view taken along the line 12—12 of FIG. 11.

While the invention will be described in connection with a preferred embodiment and several other embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION

Figure 1:
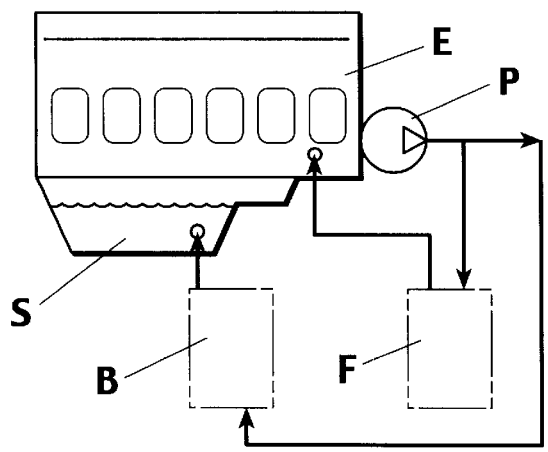
FIG. 1 is a block diagram illustrating the flow patterns of known engine lubricating oil filtration systems.
Figure 2:
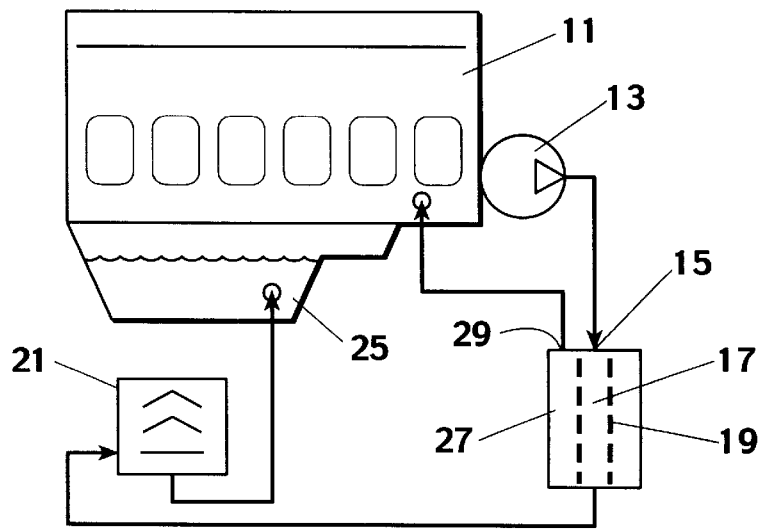
FIG. 2 is a block diagram illustrating the flow patterns of the preferred inside to outside embodiment of the self-cleaning filter.

Looking at FIG. 2, the fluid to be cleaned in a diesel engine 11 or other fluid source is delivered under pressure by a pump 13 through the filter inlet 15 to the "dirty" side 17 of a barrier 19 with defined particle size passages (not shown in this Figure) through its walls. The "dirty" or upstream side 17 of this barrier 19 is in constant communication with a centrifuge 21 which draws fluid across the barrier 17 and through the filter outlet 23. The centrifuge 21 then delivers the drawn fluid to the engine sump 25 or other reservoir. As shown in FIG. 2, fluid flows through the barrier 17 in a preferred inside-to-outside flow path 27. Fluid flowing through the barrier passages (not shown in this Figure) is returned through the barrier "clean" side outlet 29 to the engine 11 or other fluid reservoir.

Figure 3:
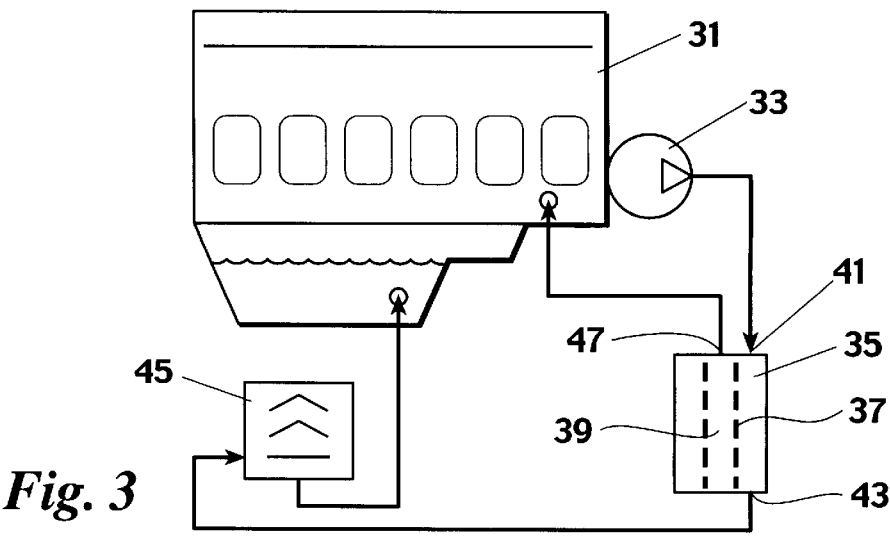
FIG. 3 is a block diagram illustrating the flow patterns of the outside to inside embodiment of the self-cleaning filter.

As shown in FIG. 3, the filter system can be configured so that fluid delivered from the engine 31 in the pump 33 flows in an outside to outside-to-inside path 35. In this case, the outside 37 of the barrier 39 is the "dirty" side. The filter inlet 41 and outlet 43 are therefor located so that the pump 31 delivers the fluid to the "dirty" side 37 of the barrier 39 and the centrifuge 45 draws fluid from the "dirty" side 37 of the barrier 39. Fluid is delivered through the "clean" side barrier outlet 47 to the engine 31 or other fluid reservoir.

Figure 4:
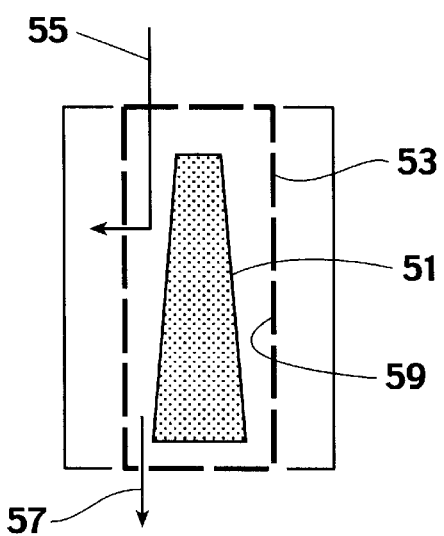
FIG. 4 is a one-line diagram illustrating an increased flow velocity modification to the inside to outside embodiment of the self-cleaning filter.
Figure 5:
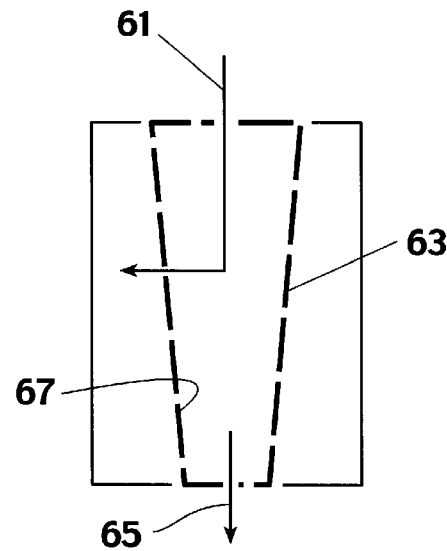
FIG. 5 is a one-line diagram illustrating another increased flow velocity modification to the inside to outside embodiment of the self-cleaning filter.
Figure 6:
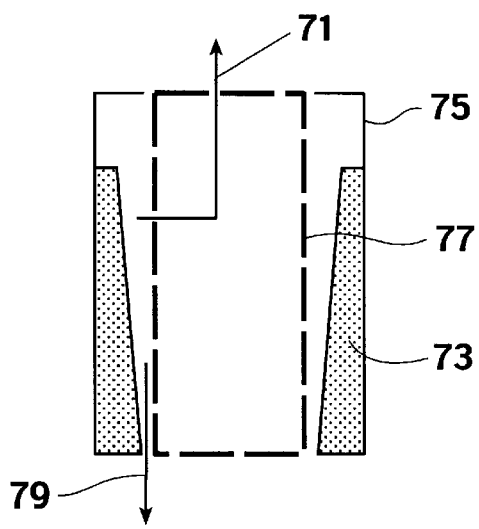
FIG. 6 is a one-line diagram illustrating an increased flow velocity modification to the outside to inside embodiment of the self-cleaning filter.
Figure 7:
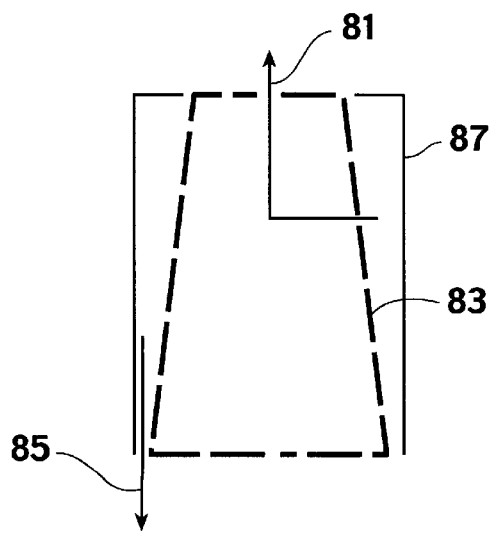
FIG. 7 is a one-line diagram illustrating another increased flow velocity modification to the outside to inside embodiment of the self-cleaning filter.

Turning to FIGS. 4 through 7, modifications to the flow paths of both inside-to-outside and outside-to-inside embodiments of the filters are illustrated. In FIG. 4, a conical insert 51 in the barrier 53 of an inside-to-outside 55 filter increases flow velocity 57 across the barrier "dirty" surface 59 to enhance the removal of collected particles or debris from the "dirty" surface 59. In FIG. 5, the same result is accomplished in an inside-to-outside 61 filter by using a barrier 63 having the shape of an inverted cone. The increased velocity 65 through the barrier 63 enhances removal of particles and debris from the "dirty" surface 67 of the barrier 63. In FIG. 6, this principle is applied to an outside-to-inside 71 filter by use of an insert 73 having an inverted conical inner surface between the filter casing 75 and the barrier 77 to increase the "dirty" side flow velocity 79. In FIG. 7, the same result is achieved in an outside-to-inside 81 filter by use of a conical barrier 83 providing increased fluid velocity 85 between the barrier 83 and the filter casing 87.

Looking now at FIG. 8, a preferred embodiment of an inside-to-outside filter 90 is illustrated in greater detail. A cylindrical filter case 91 has an inlet 93 through its upper end 95, a "clean" side outlet 97 through its side wall 99 and a "dirty" side outlet 101 through its lower end 103. A cylindrical barrier 105 is concentrically mounted in the case 91, providing an annulus 107 between the case 91 and the barrier 105. Fluid containing suspended particles and debris is admitted under pressure into the barrier 105 through the filter inlet 93. The barrier 105 has an axial flow path 109 which extends to the "dirty" side outlet 101 of the filter 90. A plurality of radial passages 111 though the barrier wall 105 collects particles and debris on the "dirty" surface 113 of the barrier 105 as some of the admitted fluid flows through the barrier 105 into the annulus 107. Fluid in the annulus 107 is discharged 115 through the "clean" side filter outlet 97. A centrifuge (not shown in this Figure) draws some of the fluid through the barrier 105 across the "dirty" surface 113 of the barrier 105 to wash the collected particles and debris from the "dirty" surface 113.

FIG. 9 illustrates the easiest adaptation of an inside-to-outside filter 120 to an outside-to-inside engine mount (not shown). This adaptation is in spin-on form. The normal flow routing of typical spin-on filters produced today is outside-to-inside. However, a simple adapter 121 having flow direction changing passages 123 and 125 is built into the open end 127 of the spin-on to reverse the flow 129 to allow use of an inside-to-outside barrier 131 which is preferred to promote a self-cleaning action in the filter. The filter outlet 133 is connected to the centrifuge (not shown) to draw fluid 135 along the "dirty" side 137 of the barrier 131.

The preferred wedgewire barrier 140 is illustrated in FIG. 10. The barrier 140 consists of a cylindrical wedgewire screen. Individual wedgewires 141 of the screen preferably extend parallel to the longitudinal axis 143 of the filter (not shown). In the inside-to-outside embodiment depicted, the base portions 145 of the wedgewire cross-sections define the inner surface or "dirty" side 147 of the barrier 140. The longitudinal spaces 149 between the individual wedgewires 141 provide the radial passages through which some of the fluid will flow, the distance between the wedgewires being selected to collect the desired size particles and debris on the "dirty" surface 147 of the barrier 140. The wedgewires 141 are held in place by circumferential wires 151 fixed to the apices 153 of the wedgewires 141. If an outside-to-inside wedgewire screen is desired, the relationships of the wedgewire base and apices would be reversed as well as the positioning of the circumferential wires. That is, the bases 145 of the wedgewire cross-sections will be on the outer surface or "dirty" side of the barrier and the circumferential wires will be fixed to the apices 153 of the wedgewires on the inside of the barrier.

As shown in FIGS. 11 and 12, thin-walled metal stock 160 having semi-conical apertures 161 on one surface, may also be used to form inside-to-outside or outside-to-inside barriers. As shown, the metal is similar to the vegetable grating wall of a typical cheese grater. The semi-conical apertures 161 protrude from one side 163 of the stock 160 and are preferably arranged in an off-set matrix 165 with their apices 167 aligned in the same direction. The stock 160 can be formed into cylindrical or conical barriers as shown in FIGS. 4 through 7. The semi-conical apertures 161 provide the radial passages through the barrier. The side of the stock 160 from which the apertures 161 protrude is preferably the "clean" surface of the barrier and it is preferred that the semi-conical apertures 161 point in the direction of or transverse to axial flow through the barrier. However, any direction will work, though perhaps not as efficiently.

The centrifuge may be self-powered, motor-driven or a pelton-wheel style drive. The self-powered centrifuge is preferred because it is retrofittable across almost all platforms and is easy to integrate as a basic engine modification. The barrier may be engine-mounted in a canister or inside a permanent spin-on housing or separately mounted external to the engine.

Thus, it is apparent that there has been provided, in accordance with the invention, a self-cleaning filter that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A filter comprising a flow path having an inlet for delivering fluid with particles suspended therein under pressure against one surface of a particle barrier therebetween and an outlet arranged for discharging fluid containing suspended particles having not passed through said barrier, said barrier having a plurality of fluid passages therethrough sized to collect particles suspended in the fluid on said one surface of said barrier while passing some of the fluid through said barrier, and a centrifuge serially connected to said outlet for drawing fluid containing suspended particles across said surface to wash collected particles from said surface of said barrier wall.

2. A filter comprising:
   a particle barrier having an axial fluid passage with an inlet at one end thereof for admitting fluid containing suspended particles into said barrier and an outlet at another end thereof arranged for discharging fluid containing suspended particles having not passed through said barrier and a plurality of radial fluid passages through a wall thereof sized to collect particles suspended in the fluid on an inner surface of said wall while passing some of the fluid through said wall; and a centrifuge serially connected to said axial passage outlet for drawing fluid containing suspended particles through said axial passage to wash collected particles from said inner. surface of said barrier wall.

3. A filter according to claim 2, said barrier comprising a cylindrical wedgewire screen, individual wedgewires of said screen extending parallel to a longitudinal axis of the filter with base portions of their cross-sections defining an inner wall of the filter and said radial passages comprising longitudinal spaces between said wedgewires.

4. A filter according to claim 3 further comprising a conical member concentrically aligned within said axial passage to increase a velocity of fluid containing suspended particles flowing through said axial passage.

5. A filter according to claim 2, said barrier comprising a thin-walled metal cylinder and said radial passages comprising a matrix of semi-conical apertures on an outer wall of said cylinder.

6. A filter according to claim 5, said semi-conical apertures pointing in a direction of said axial flow.

7. A filter according to claim 5, said semi-conical apertures pointing in a direction transverse to said axial flow.

8. A filter according to claim 2, said barrier comprising an inverted thin-walled metal cone and said radial passages comprising a matrix of semi-conical apertures on an outer wall of said cone.

9. A filter according to claim 8, said semi-conical apertures pointing in a direction of said axial flow.

10. A filter according to claim 8, said semi-conical apertures pointing in a direction transverse to said axial flow.

11. A filter comprising:
a cylindrical case having a longitudinal axis;
a particle barrier within said case concentrically aligned on said longitudinal axis to define an annular fluid passage with an inlet at one end thereof for admitting fluid containing suspended particles into said annular passage and an outlet at another end thereof for discharging fluid containing suspended particles from said annular passage and a plurality of radial fluid passages through a wall of said barrier sized to collect particles suspended in the fluid on an outer surface of said wall while passing some of the fluid through said wall; and
a centrifuge serially connected to said annular passage outlet for drawing fluid containing suspended particles through said annular passage to wash collected particles from said outer surface of said barrier wall.

12. A filter according to claim 11, said barrier comprising a cylindrical wedgewire screen, individual wedgewires of said screen extending parallel to said longitudinal axis of the filter with base portions of their cross-sections defining an outer wall of the filter and said radial passages comprising longitudinal spaces between said wedgewires.

13. A filter according to claim 12 further comprising a conical member concentrically aligned within said annular passage to increase a velocity of fluid containing suspended particles flowing through said annular passage.

14. A filter according to claim 11, said barrier comprising a thin-walled metal cylinder and said radial passages comprising a matrix of semi-conical apertures on an inner wall of said cylinder.

15. A filter according to claim 14, said semi-conical apertures pointing in a direction of said annular flow.

16. A filter according to claim 14, said semi-conical apertures pointing in a direction transverse to said annular flow.

17. A filter according to claim 11, said barrier comprising a thin-walled metal cone and said radial passages comprising a matrix of semi-conical apertures on an inner wall of said cone.

18. A filter according to claim 17, said semi-conical apertures pointing in a direction of said annular flow.

19. A filter according to claim 17, said semi-conical apertures pointing in a direction transverse to said annular flow.

20. A method for removing particles from suspension in a fluid comprising the steps of:
delivering fluid with particles suspended therein under pressure against one surface of a particle barrier;
passing some of the delivered fluid through a wall of the barrier to collect particles on the one surface thereof; and
drawing the remainder of the fluid containing suspended particles across the one surface of the barrier using a centrifuge to wash collected particles from the one surface of the barrier.

21. A method for removing particles from suspension in a fluid comprising the steps of:
admitting fluid containing suspended particles into a particle barrier having an axial fluid passage and a plurality of radial fluid passages through a wall thereof, the radial passages being sized to collect particles suspended in the fluid on an inner surface of the wall;
passing some of the admitted fluid through the wall to collect particles on the inner surface thereof; and
drawing the remainder of the fluid containing suspended particles through the axial passage using a centrifuge serially connected to the axial passage to wash collected particles from the inner surface of the barrier wall.

22. A method for removing particles from suspension in a fluid comprising the steps of:
admitting fluid containing suspended particles into an annular fluid passage defined by a cylindrical case having a longitudinal axis and a particle barrier concentrically aligned within the case, the barrier having a plurality of radial fluid passages through a wall thereof, the radial passages being sized to collect particles suspended in the fluid on an outer surface of the wall;
passing some of the admitted fluid through the wall to collect particles on the outer surface thereof; and
drawing the remainder of the fluid containing suspended particles through the annular passage using a centrifuge serially connected to the annular passage to wash collected particles from the outer surface of the barrier wall.

* * * * *